（12）United States Patent
Murree

(10) Patent No.: US 9,174,519 B2
(45) Date of Patent: Nov. 3, 2015

(54) WEATHERSTRIP ASSEMBLY HAVING A VARIABLE LENGTH SHIM

(71) Applicant: Henniges Automotive Sealing Systems North America, Inc., Dover, DE (US)

(72) Inventor: Stephen J. Murree, Macomb, MI (US)

(73) Assignee: HENNIGES AUTOMOTIVE SEALING SYSTEMS NORTH AMERICA INC., Auburn Hills, MI (US)

( * ) Notice: Subject to any disclaimer, the term of this patent is extended or adjusted under 35 U.S.C. 154(b) by 0 days.

(21) Appl. No.: 13/655,005

(22) Filed: Oct. 18, 2012

(65) Prior Publication Data

US 2013/0091777 A1    Apr. 18, 2013

Related U.S. Application Data

(60) Provisional application No. 61/548,425, filed on Oct. 18, 2011.

(51) Int. Cl.
  *E06B 7/16* (2006.01)
  *B60J 10/00* (2006.01)
  *B60J 10/08* (2006.01)
(52) U.S. Cl.
  CPC .......... *B60J 10/0031* (2013.01); *B60J 10/0068* (2013.01); *B60J 10/08* (2013.01)
(58) Field of Classification Search
  USPC .................. 49/490.1, 492.1, 498.1, 475.1
  See application file for complete search history.

(56) References Cited

U.S. PATENT DOCUMENTS

| 4,256,685 A | 3/1981 | Vassar |
| 4,576,773 A | 3/1986 | Azzola et al. |
| 4,584,150 A | 4/1986 | Ballocca |
| 4,619,077 A | 10/1986 | Azzola et al. |

(Continued)

FOREIGN PATENT DOCUMENTS

| EP | 0532163 A1 | 3/1993 |
| EP | 0602320 A  | 6/1994 |

(Continued)

OTHER PUBLICATIONS

English language abstract for EP 1705046 extracted from espacenet.com on Mar. 20, 2013, 1 page.

(Continued)

*Primary Examiner* — Katherine Mitchell
*Assistant Examiner* — Shiref Mekhaeil
(74) *Attorney, Agent, or Firm* — Howard & Howard Attorneys PLLC

(57) ABSTRACT

The subject invention provides a weatherstrip assembly for sealing between a frame and a closure member of a vehicle. The weatherstrip assembly includes a body having an exterior surface and an interior surface defining a channel. The body has a plurality of retaining lips extending into the channel. A seal extends from the exterior surface. A locking fin has a first end and a second end. The first end of the locking fin is mounted to one of the interior surface and the exterior surface and the second end of the locking fin disposed within the channel. A shim extends from the second end of the locking fin. The shim engages the interior surface and supports the locking fin within the channel. The retaining lips and the locking fin at least partially define a slot for sandwiching the frame between the retaining lips and the locking fin within the slot.

11 Claims, 7 Drawing Sheets

(56) References Cited

U.S. PATENT DOCUMENTS

| | | | |
|---|---|---|---|
| 4,690,412 A * | 9/1987 | Tuckley et al. | 277/642 |
| 4,702,039 A * | 10/1987 | Bocchinfuso | 49/490.1 |
| 4,745,016 A * | 5/1988 | Hashimoto et al. | 428/122 |
| 4,765,936 A | 8/1988 | Ballocca | |
| 4,787,668 A | 11/1988 | Kawase et al. | |
| 4,848,035 A * | 7/1989 | Sakuma et al. | 49/490.1 |
| 4,861,530 A | 8/1989 | Zaccaria | |
| 4,865,676 A | 9/1989 | Kimura et al. | |
| 4,865,796 A | 9/1989 | Tamura et al. | |
| 4,869,945 A * | 9/1989 | Harney | 428/122 |
| 4,918,867 A | 4/1990 | Hayashi et al. | |
| 4,949,507 A | 8/1990 | Vaughan | |
| 4,959,081 A | 9/1990 | Mathellier | |
| 4,960,375 A | 10/1990 | Saito et al. | |
| 4,989,371 A | 2/1991 | Mancosu et al. | |
| 5,010,689 A * | 4/1991 | Vaughan | 49/440 |
| 5,028,460 A | 7/1991 | Kimura et al. | |
| 5,067,280 A | 11/1991 | Arima | |
| 5,078,444 A | 1/1992 | Shirahata et al. | |
| 5,085,006 A | 2/1992 | Hayashi et al. | |
| 5,110,529 A | 5/1992 | Arima | |
| 5,133,537 A | 7/1992 | Shirahata et al. | |
| 5,162,090 A | 11/1992 | Arima | |
| 5,207,027 A | 5/1993 | Larsen | |
| 5,233,805 A | 8/1993 | Hirai et al. | |
| 5,305,553 A * | 4/1994 | Shimizu et al. | 49/490.1 |
| 5,350,211 A | 9/1994 | Yada et al. | |
| 5,360,251 A | 11/1994 | Watanabe et al. | |
| 5,445,780 A | 8/1995 | Yada et al. | |
| 5,447,670 A | 9/1995 | Ito et al. | |
| 5,474,817 A | 12/1995 | Yada et al. | |
| 5,534,316 A | 7/1996 | Yada et al. | |
| 5,626,383 A | 5/1997 | Lee et al. | |
| 5,679,303 A | 10/1997 | Hayashi et al. | |
| 5,693,419 A | 12/1997 | Nozaki | |
| 5,772,940 A | 6/1998 | Aoyama | |
| 5,776,403 A | 7/1998 | Yada et al. | |
| 5,783,312 A | 7/1998 | Laughman et al. | |
| 5,792,405 A | 8/1998 | Tsuchida et al. | |
| 5,797,644 A | 8/1998 | Hamabata | |
| 5,833,297 A | 11/1998 | Yada et al. | |
| 5,958,318 A | 9/1999 | Hayashi | |
| 6,096,402 A | 8/2000 | Tamura | |
| 6,143,397 A * | 11/2000 | Kanehara | 428/192 |
| 6,174,477 B1 | 1/2001 | Nagahashi et al. | |
| 6,250,018 B1 | 6/2001 | Kawai et al. | |
| 6,311,450 B1 | 11/2001 | Tanigaki et al. | |
| 6,405,489 B1 | 6/2002 | Miura | |
| 6,406,785 B1 | 6/2002 | Janes et al. | |
| 6,647,666 B2 | 11/2003 | Kawai et al. | |
| 6,647,667 B2 | 11/2003 | Mine et al. | |
| 6,716,496 B2 * | 4/2004 | Nakajima et al. | 428/34.1 |
| 6,755,638 B2 | 6/2004 | Chen et al. | |
| 6,889,472 B2 | 5/2005 | Nozaki et al. | |
| 6,922,945 B2 * | 8/2005 | Dron | 49/477.1 |
| 6,935,072 B2 | 8/2005 | Kogiso et al. | |
| 7,257,924 B2 * | 8/2007 | Kounobu et al. | 49/490.1 |
| 7,281,354 B2 * | 10/2007 | Nishihara | 49/498.1 |
| 7,997,030 B2 | 8/2011 | Willett | |
| 8,225,554 B2 | 7/2012 | Nozaki | |
| 8,225,676 B2 | 7/2012 | Charlier | |
| 2001/0027622 A1 | 10/2001 | Mine et al. | |
| 2004/0043188 A1 * | 3/2004 | Tsujiguchi | 428/122 |
| 2004/0161584 A1 | 8/2004 | Aritake et al. | |
| 2005/0064135 A1 * | 3/2005 | Perrin | 428/122 |
| 2005/0193636 A1 | 9/2005 | Jyawook et al. | |
| 2005/0246963 A1 * | 11/2005 | Kogiso et al. | 49/498.1 |
| 2006/0112645 A1 * | 6/2006 | Dron | 49/498.1 |
| 2011/0162285 A1 | 7/2011 | Lichtner et al. | |
| 2011/0296763 A1 | 12/2011 | Lee et al. | |
| 2012/0060424 A1 | 3/2012 | Willett | |
| 2012/0079772 A1 * | 4/2012 | Mine | 49/490.1 |
| 2012/0174491 A1 * | 7/2012 | Clark et al. | 49/490.1 |
| 2012/0180398 A1 | 7/2012 | Priess et al. | |
| 2012/0192489 A1 | 8/2012 | Pribisic | |

FOREIGN PATENT DOCUMENTS

| | | |
|---|---|---|
| EP | 0904914 A2 | 3/1999 |
| EP | 1273471 A2 | 1/2003 |
| EP | 1277608 A1 | 1/2003 |
| EP | 1705046 A1 | 9/2006 |
| EP | 2479051 A1 | 7/2012 |
| FR | 2541176 A1 | 8/1984 |
| GB | 2133823 A | 8/1984 |
| JP | 59114040 A | 6/1984 |
| JP | 01-269525 A | 10/1989 |
| JP | 02-068240 A | 3/1990 |
| JP | 10-006379 A | 1/1998 |
| JP | 2000-071901 A | 7/2000 |
| WO | WO 98/21061 A1 | 5/1998 |
| WO | WO 2012/056912 A1 | 5/2012 |
| WO | WO 2012/099292 A1 | 7/2012 |

OTHER PUBLICATIONS

English language abstract for FR 2541176 extracted from espacenet.com on Mar. 20, 2013, 2 pages.
English language abstract for JP 01-269525 extracted from PAJ database on Mar. 20, 2013, 2 pages.
English language abstract for JP 02-068240 extracted from PAJ database on Mar. 20, 2013, 1 page.
English language abstract and translation for JP 10-006379 extracted from PAJ database on Mar. 20, 2013, 37 pages.
English language abstract and translation for JP 2000-071901 extracted from PAJ database on Mar. 20, 2013, 26 pages.
English language abstract for WO 12/099292 extracted from espacenet.com database on Mar. 21, 2013, 19 pages.

* cited by examiner

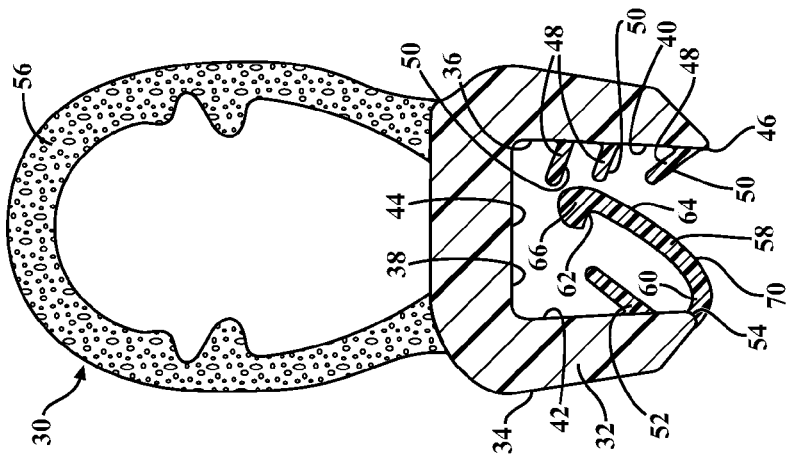
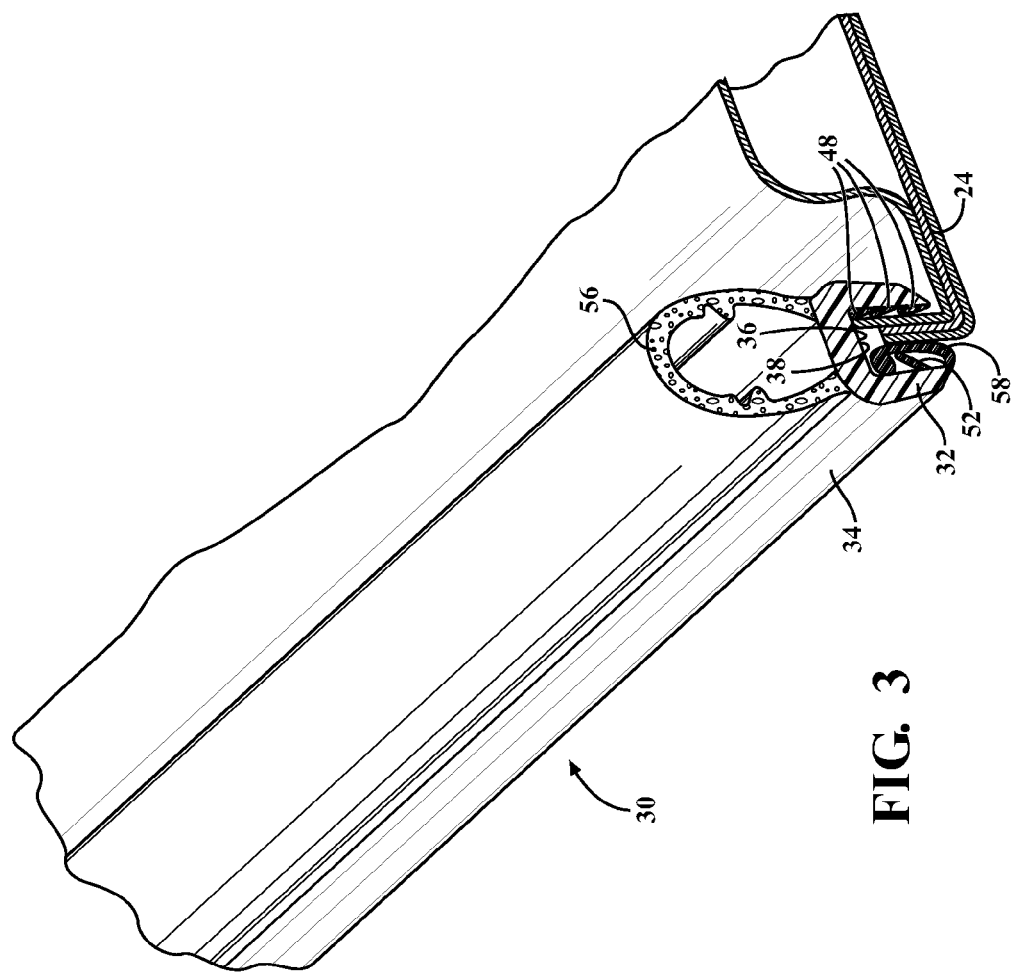
FIG. 4A
FIG. 3

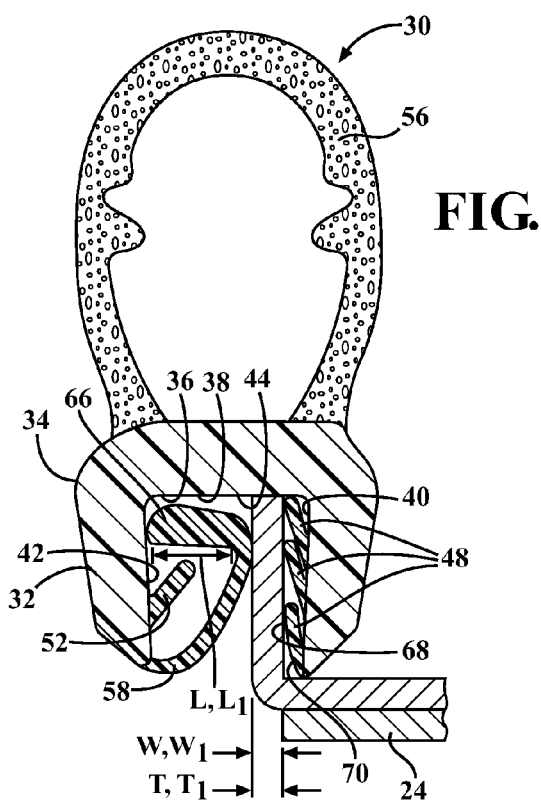
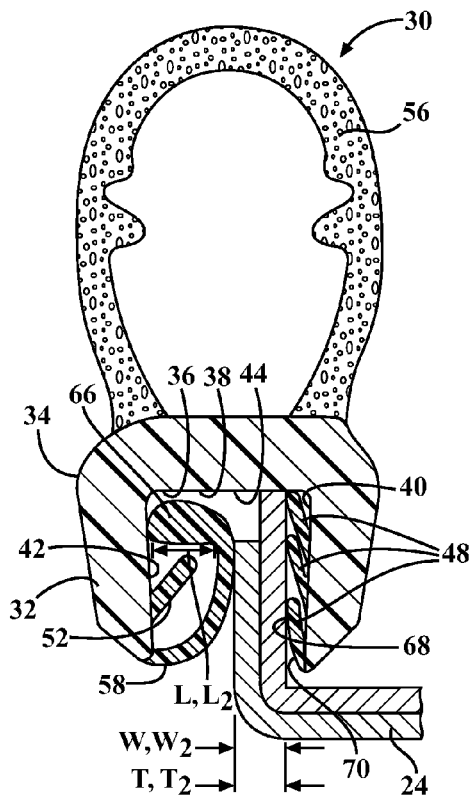
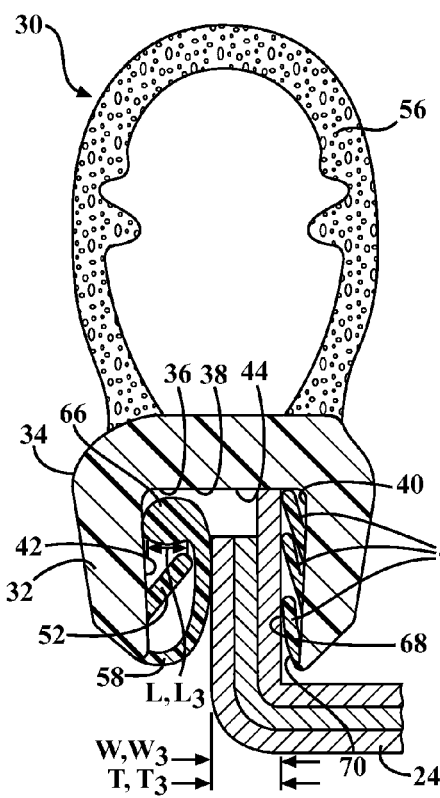
FIG. 5
FIG. 6
FIG. 7

WEATHERSTRIP ASSEMBLY HAVING A VARIABLE LENGTH SHIM

RELATED APPLICATION

This application claims priority to and all advantages of U.S. Provisional Patent Application No. 61/548,425, which was filed on Oct. 18, 2011.

BACKGROUND OF THE INVENTION

1. Field of the Invention

A weatherstrip assembly for sealing between a frame and a closure member of a vehicle. In particular, the subject invention relates to a unique design of a locking fin and a shim for the assembly.

2. Description of Related Art

There is a desire within the transportation industry to easily couple a weatherstrip to a frame of a vehicle. Many techniques have been used to hold a weatherstrip to a frame during assembly. One solution in the industry involves a weatherstrip having a body defining a cavity into which the frame is disposed. A plurality of fingers extend from the body within the cavity. The frame has a thickness. The fingers abut the frame and provide a friction coupling between the body and the frame. The friction coupling mounts the weatherstrip to the frame. It is noteworthy though that not all frames have a continuous thickness. Often, converging sheet metal panels at unique positions on the vehicle create varying thicknesses longitudinally along the frame. As a result, the engagement of the fingers with the frame varies depending on the thickness of the frame. When engagement of the fingers with the frame is reduced, the friction coupling between the body and the frame is reduced, which could lead to disconnection of the weatherstrip assembly from the frame.

Therefore, there remains an opportunity to develop a weatherstrip capable of varying the friction force imparted on the frame depending on the thickness of the frame.

SUMMARY OF THE INVENTION AND ADVANTAGES

The subject invention provides for a weatherstrip assembly for sealing between a frame and a closure member of a vehicle. The weatherstrip assembly includes a body having an exterior surface and an interior surface defining a channel. The body has a plurality of retaining lips extending from the interior surface into the channel for retaining the body to the frame. A seal extends from the exterior surface for abutting and sealing the closure member. A locking fin has a first end and a second end. The first end of the locking fin is mounted to one of the interior surface and the exterior surface and the second end of the locking fin disposed within the channel to at least partially dispose the locking fin within the channel. A shim extends from the second end of the locking fin. The shim engages the interior surface and supports the locking fin within the channel. The retaining lips and the locking fin at least partially define a slot for sandwiching the frame between the retaining lips and the locking fin within the slot.

Additionally, the subject invention provides for a method of producing a weatherstrip assembly including a body having a longitudinal dimension, a locking fin having a length dimension, and a shim having a length. The method includes the steps of extruding the body along the longitudinal dimension and simultaneously extruding the locking fin along the longitudinal dimension of the body with the length dimension of the locking fin remaining constant along the longitudinal dimension. The method further includes the step of simultaneously extruding the shim along the longitudinal dimension of the body with the length of the locking fin varying along the longitudinal dimension.

Furthermore, the subject invention provides for a method of assembling a weatherstrip assembly on a vehicle with the vehicle having a frame. The weatherstrip assembly has a body defining a channel and having an interior surface within the channel. The body has a plurality of retaining lips extending into the channel. A seal and a locking fin extend from the body. A shim extends from the locking fin, and the retaining lips and the locking fin partially define a slot. The method includes the steps of moving the locking fin relative to the body and disposing the shim and a portion of the locking fin within the channel. The method also includes the steps of abutting the shim with the interior surface and disposing the frame within the slot to sandwich the frame between the retaining lips and the locking fin.

Accordingly, the subject invention provides for a weatherstrip assembly having a shim having a length, with the length of the shim varying longitudinally along the weatherstrip assembly to configure the coupling of the weatherstrip assembly to the frame according to the thickness of the frame.

BRIEF DESCRIPTION OF THE DRAWINGS

Advantages of the subject invention will be readily appreciated as the same becomes better understood by reference to the following detailed description when considered in connection with the accompanying drawings.

FIG. 3 is a cross-sectional perspective view of the weatherstrip assembly coupled to the frame;

FIG. 4A is a cross-sectional view of a first embodiment of the weatherstrip assembly;

FIG. 5 is a cross-sectional view of the weatherstrip assembly coupled to the frame with the weatherstrip assembly having a shim having length $L_1$ and the frame having a first thickness $T_1$;

FIG. 6 is a cross-sectional view of the weatherstrip assembly coupled to the frame with the shim having length $L_2$ and the frame having a second thickness $T_2$;

FIG. 7 is a cross-sectional view of the weatherstrip assembly coupled to the frame with the shim having length $L_3$ and the frame having a third thickness $T_3$;

DETAILED DESCRIPTION OF THE INVENTION

Figure 1:
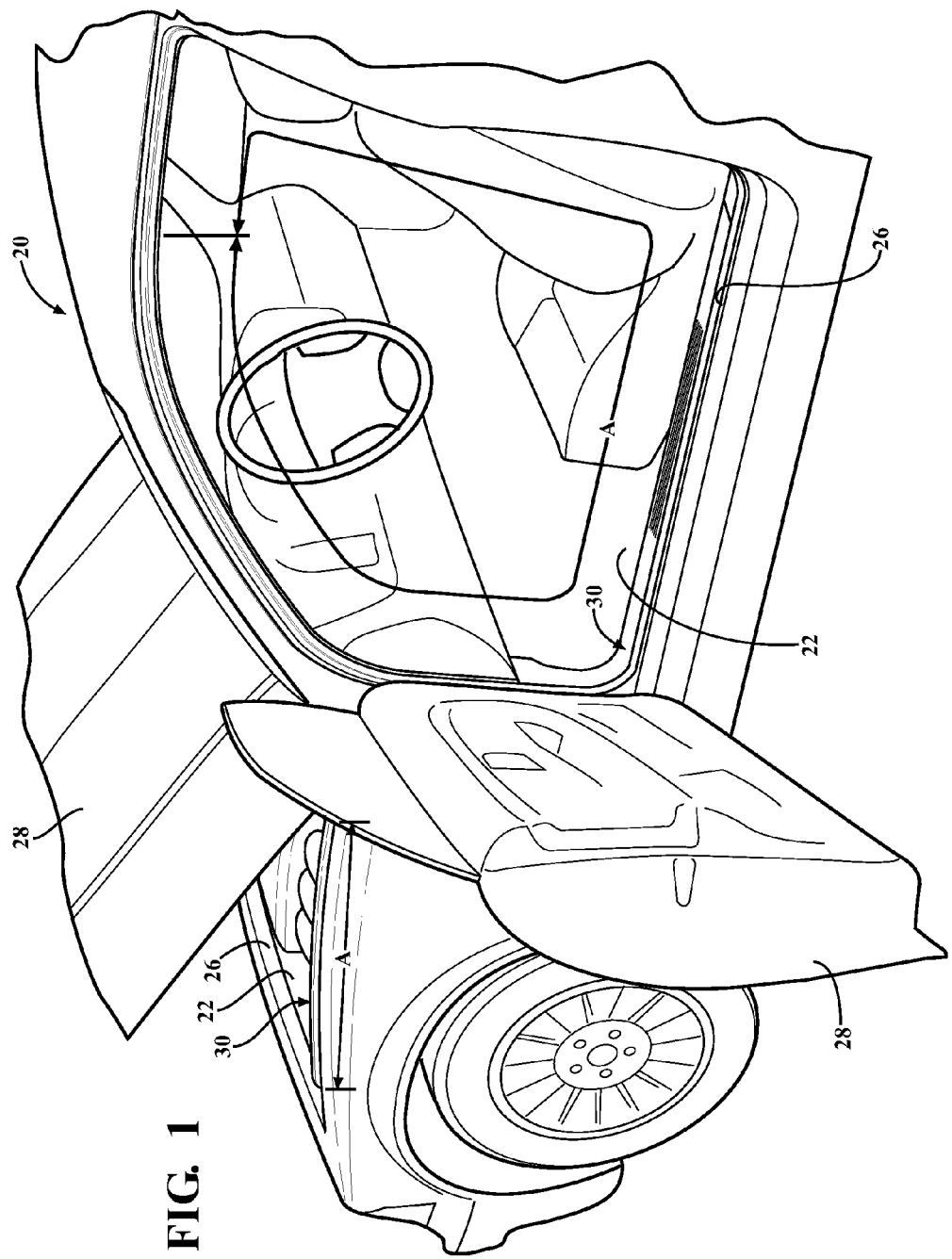
FIG. 1 is a perspective view of a vehicle having a weatherstrip assembly.
Figure 2:
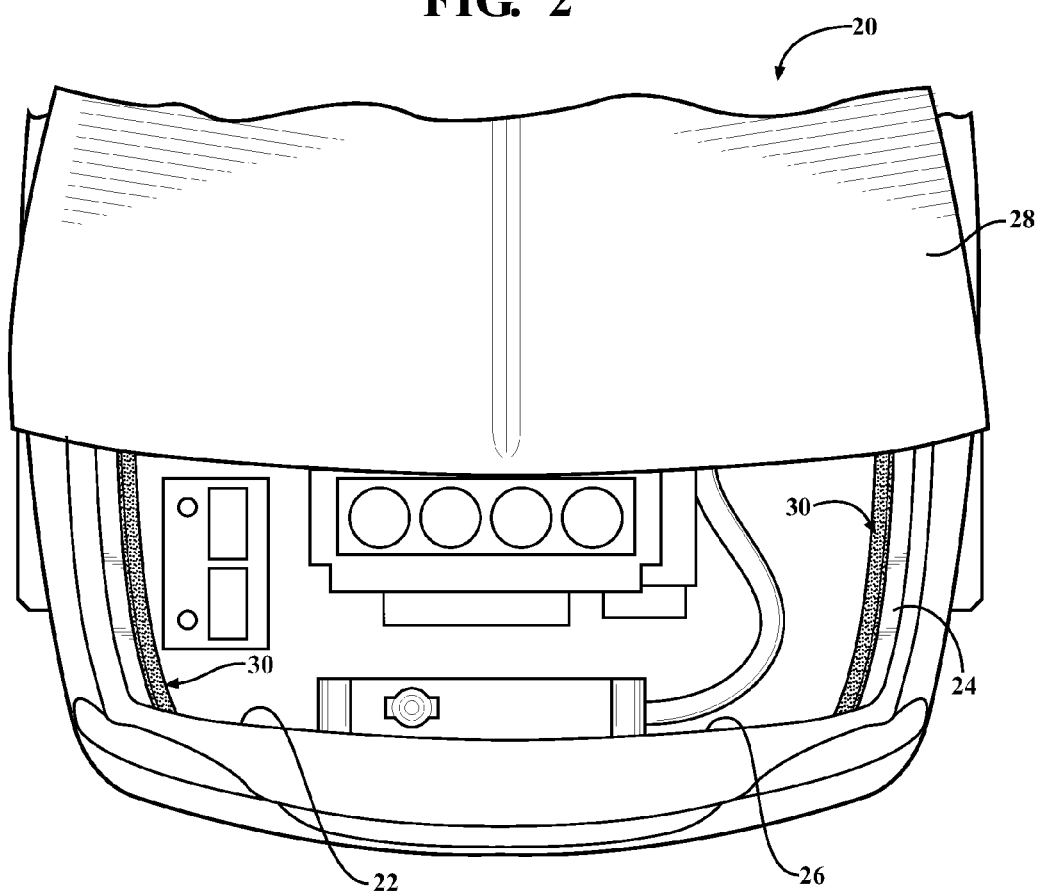
FIG. 2 is a side plan view of a frame with the weatherstrip assembly mounted to the frame.

Referring to the Figures, wherein like numerals indicate like or corresponding parts throughout the several views, a vehicle 20 is generally shown in FIG. 1. The vehicle 20 is typically a passenger car or a truck. However, it is to be appreciated that the vehicle 20 can be any configuration for providing transportation. The vehicle 20 defines an interior 22 for disposing an article (not shown) within. Typically, the interior 22 is an engine compartment with the article including, but not-limited to, an engine, a battery, etc. disposed within the engine compartment. However, it is to be appreciated that the interior 22 can be a passenger compartment, a trunk, or any other interior 22 defined by the vehicle 20. It is also to be appreciated that the article can be an operator, a passenger, luggage, etc. or any other item to be transported by the vehicle 20 within the interior 22. As shown in FIG. 2, the vehicle 20 includes a frame 24 defining an aperture 26 with the aperture 26 providing access to the interior 22.

Figure 9:
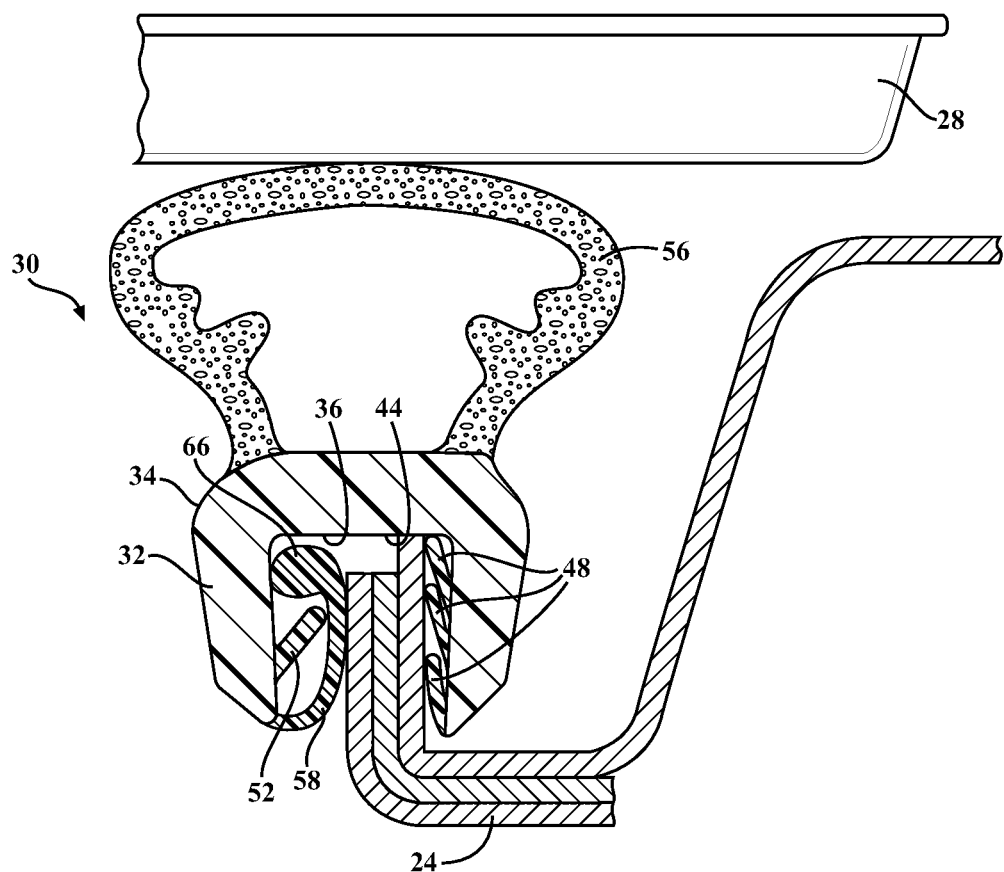
FIG. 9 is a cross-sectional perspective view of the weatherstrip assembly, with the vehicle having a closure member abutting the weatherstrip assembly.

The vehicle 20 includes a closure member 28 pivotably coupled to the frame 24, as shown in FIG. 1. Specifically, the frame 24 supports the closure member 28 with the closure member 28 pivotable relative to the frame 24 between an open position, as shown in FIG. 1, and a closed position, as shown in FIG. 9. In the closed position, the closure member 28 is at least partially disposed within the aperture 26 of the frame 24. In the open position, the closure member 28 is positioned such that the closure member 28 is not substantially planar. Said differently, in the open position the closure member 28 is pivoted relative to the frame 24 such that the closure member 28 is swung away from the frame 24. The closure member 28 is typically a hood for the engine compartment; however, it is to be appreciated that the closure member 28 can be a door, a trunk lid, or any other item pivotably coupled to the frame 24.

As shown in FIG. 3, the frame 24 has a substantial "L" configuration. Said differently, the frame 24 extends both toward the aperture 26 and is bent such that the frame 24 extends away from the interior 22 of the vehicle 20. The frame 24 can have a substantially linear configuration wherein the frame 24 only extends inwardly into the aperture 26. It is to be appreciated that the frame 24 can have any suitable configuration.

The vehicle 20 includes a weatherstrip assembly 30 for sealing between the frame 24 and the closure member 28 of the vehicle 20. The weatherstrip assembly 30 extends outwardly from the frame 24 away from the interior 22. As shown in FIG. 2, the weatherstrip assembly 30 is mounted to and extends partially along the frame 24 about the aperture 26. It is to be appreciated that the weatherstrip assembly 30 can be configured such that weatherstrip assembly 30 extends entirely along the frame 24 about the aperture 26. It is also to be appreciated that the weatherstrip assembly 30 can be disposed within the aperture 26.

Figure 4B:
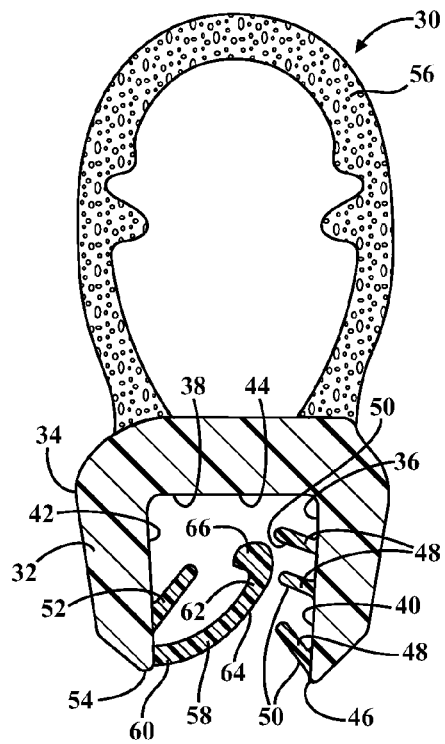
FIG. 4B is a cross-sectional view of a second embodiment of the weatherstrip assembly.

As shown in FIG. 4A, the weatherstrip assembly 30 includes a body 32. The body 32 extends longitudinally such that the body 32 has a longitudinal dimension A, as shown in FIG. 1. The body 32 has an exterior surface 34 and an interior surface 36. More specifically, the interior surface 36 defines a channel 38 extending along the longitudinal dimension A of the body 32 with the exterior surface 34 disposed outside of the channel 38. The interior surface 36 includes a retaining lip surface 40 and a shim surface 42 disposed opposite one another to define sides of the channel 38. The interior surface 36 further defines a base 44 of the channel 38 between the sides of the channel 38. The body 32 defines a channel opening 46 opposite the base 44 of the channel 38 with the channel opening 46 providing access to the channel 38. The body 32 typically has a "U" configuration with the channel 38 accepting the frame 24. However, it is to be appreciated that the body 32 can be any suitable configuration for accepting the tab. It is to be appreciated that the above mentioned body 32 is also illustrated in alternative embodiments shown in FIGS. 4B and 4C.

The body 32 has a plurality of retaining lips 48 extending from the interior surface 36 into the channel 38 for retaining the body 32 to the frame 24. The retaining lips 48 extend from the interior surface 36 and angle inwardly into the channel 38. More specifically, the retaining lips 48 extend from the retaining lip surface 40 and extend along the longitudinal dimension A of the body 32. The retaining lips 48 are spaced from one another along the retaining lip surface 40 and extend substantially parallel to one another toward the base 44 of the channel 38.

Each of the retaining lips 48 has an abutment surface 50. The abutment surfaces 50 face away from the retaining lip surface 40. Said differently, the abutment surfaces 50 face into the channel 38. Typically, the plurality of retaining lips 48 are three retaining lips 48. However, it is to be appreciated the plurality of retaining lips 48 can be any number of retaining lips 48 for engaging the frame 24.

As shown in FIG. 4A, the body 32 includes a flange 52 extending from the shim surface 42 angled inwardly into the channel 38 and extending along the longitudinal dimension A of the body 32. Said differently, the flange 52 extends from the shim surface 42 opposite the retaining lips 48, with the flange 52 extending toward the base 44 of the channel 38. The shim surface 42 has a distal end 54 adjacent the channel opening 46 of the body 32 with the flange 52 extending from the shim surface 42 between the distal end 54 and the base 44 of the channel 38. Typically, the flange 52 is a single flange 52; however, it is to be appreciated that the body 32 can be plurality of flanges 52 without departing from the scope of the subject invention.

The body 32 is typically formed of a semi-rigid elastomeric material such as rubber, ethylene-propylene-diene-monomer (EPDM), Santoprene® thermoplastic elastomer (TPE) and the like. It is also to be appreciate that the body 32 can be formed of a cellular or sponge EPDM having a lower density and rigidity or any combination of materials. In addition, it is to be appreciated that the body 32 can be any suitable hardness or hardnesses, rigidity or rigidities, density or densities, etc. It is also to be appreciated that different combinations of materials disposed in varying locations within the body 32. For example, the retaining lips 48 are typically formed of a less rigid elastomeric material than the remainder of the body 32. It is to further be appreciated that any suitable polymeric material(s) can be utilized for the body 32.

In an alternative embodiment, the body 32 includes a carrier disposed within and extending longitudinally along the body 32. More specifically, carrier is disposed within the body 32 between the exterior surface 34 and the interior surface 36. The carrier has a substantial "U" configuration and is disposed such that the carrier partially surrounds the channel 38. The carrier supports and adds further rigidity to the body 32. The carrier is typically formed of a metal, plastic, composite, etc.; however, it is to be appreciated that the carrier can be formed of any suitable material for increasing the rigidity of the body 32.

As shown in FIG. 4A, the weatherstrip assembly 30 includes a seal 56 extending from the exterior surface 34 of the body 32 for abutting and sealing the closure member 28. The seal 56 is typically disposed along the exterior of the body 32 adjacent the base 44 of the channel 38 such that the seal 56 extends away from the interior 22 of the vehicle 20. Furthermore, the seal 56 extends along the longitudinal dimension A of the body 32, as shown in FIG. 2. The seal 56 can also be disposed along exterior surface 34 adjacent the retaining lip surface 40 or the shim surface 42. It is to be appreciated that the seal 56 can be configured in any suitable position on the exterior surface 34 of the body 32 for abutting and sealing the closure member 28. It is also to be appreciated that the above mentioned seal 56 is also illustrated in alternative embodiments shown in FIGS. 4B and 4C.

The seal 56 is configured in what is commonly referred to as a "bulb" configuration. The bulb configuration of the seal 56 is deformable and such that the seal 56 abuts and forms against the closure member 28 in the closed position. It is to be appreciated that the seal 56 can be any configuration for sealing against the closure member 28.

The seal 56 is typically formed of polymeric material(s) such as cellular or sponge EPDM. In another embodiment, the polymeric material(s) of the seal 56 is further defined as TPE. It is to be appreciated at any suitable polymeric material(s) can be utilized for the seal 56. It is to further be appreciated that the seal 56 can be any suitable hardness or hardnesses, rigidity or rigidities, density or densities, etc.

Figure 4C:
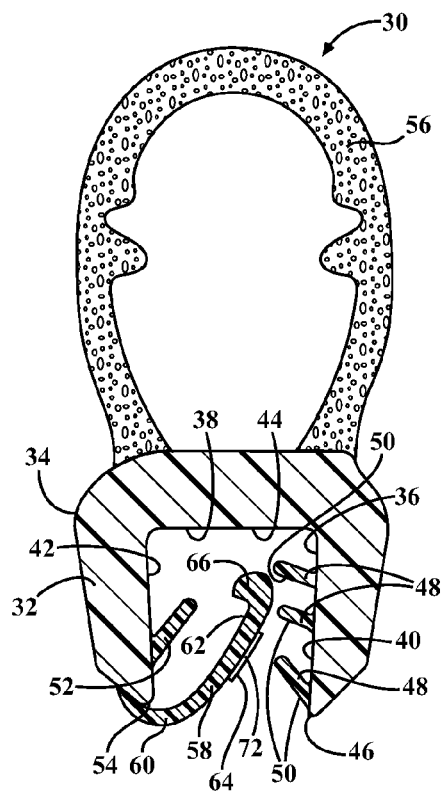
FIG. 4C is a cross-sectional view of a third embodiment of the weatherstrip assembly.

The weatherstrip assembly 30 further includes a locking fin 58 having a first end 60 and a second end 62. The first end 60 of the locking fin 58 is mounted to one of the interior surface 36 and the exterior surface 34 of the body 32 and the second end 62 of the locking fin 58 disposed within the channel 38 to at least partially dispose the locking fin 58 within the channel 38. As shown in FIG. 4A, the first end 60 of the locking fin 58 is mounted to the exterior surface 34 of the body 32. More specifically, the first end 60 of the locking fin 58 is mounted to the exterior surface 34 of the body 32 adjacent the distal end 54 of the shim surface 42. However, in an alternative embodiment, the first end 60 of the locking fin 58 is mounted to the interior surface 36 of the body 32, as shown in FIG. 4B. More specifically, the first end 60 of the locking fin 58 is be mounted to the shim surface 42 between the distal end 54 and the flange 52. In yet another embodiment, the first end 60 of the locking fin 58 is mounted to the exterior surface 34 of the body 32 proximate to, but spaced from, the distal end 54 of the shim surface 42, as shown in FIG. 4C. It is to be appreciated that the first end 60 of the locking fin 58 can be mounted in any configuration to at least partially dispose the locking fin 58 within the channel 38. Furthermore, the locking fin 58 has a length dimension D between the first end 60 and the second end 62 with the length dimension D being constant along the longitudinal dimension A of the body 32, as shown in FIG. 8.

Figure 8:
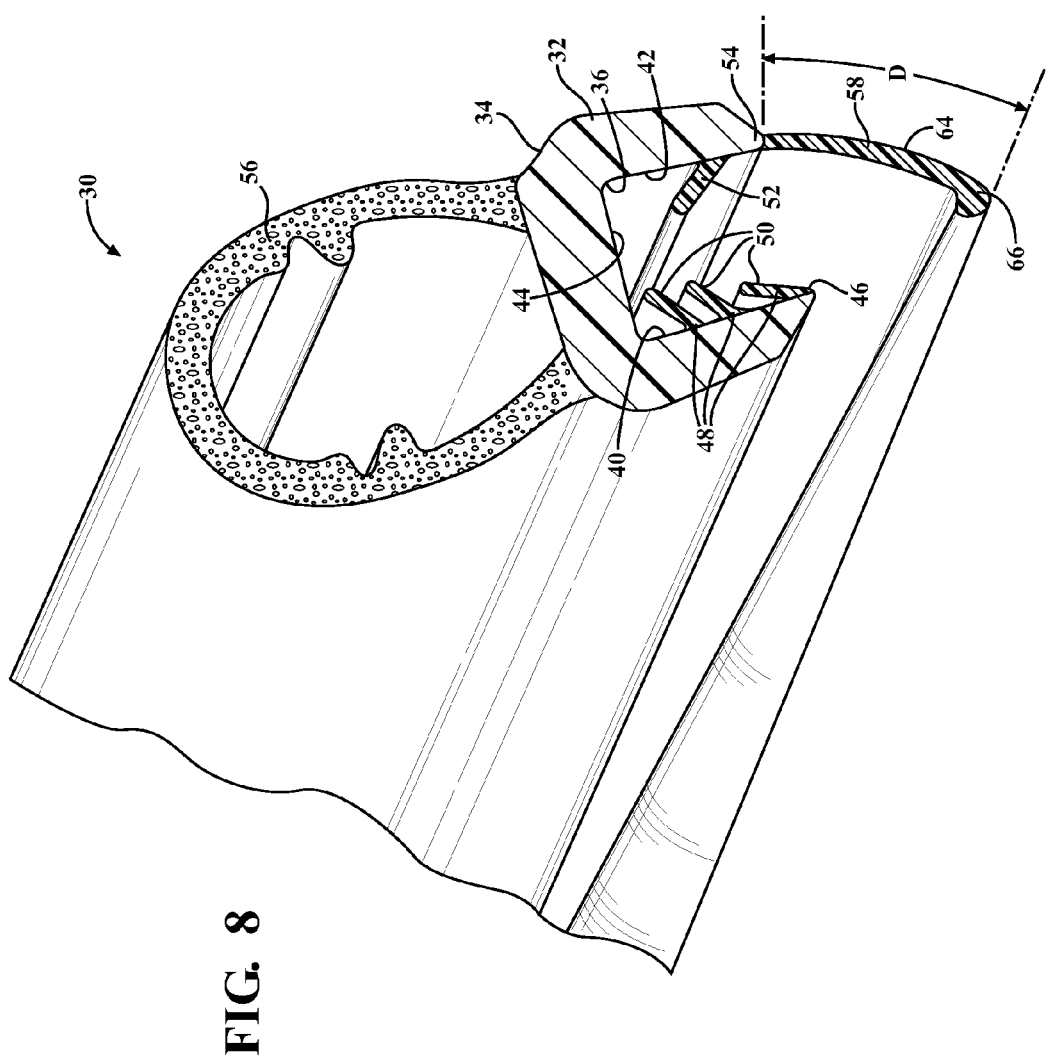
FIG. 8 is a cross-sectional perspective view of the weatherstrip assembly.

Typically, the locking fin 58 is movable relative to the body 32 between a forming position, as shown in FIG. 8, and an insertion position, as shown in each of the embodiments respectively illustrated in FIGS. 4A, 4B, and 4C. In the forming position, the locking fin 58 has a substantially linear configuration with the locking extending outwardly from the body 32 away from the channel 38. The configuration of the locking fin 58 in the forming position simplifies the formation of the locking fin 58 by an extrusion process. In the insertion position, the locking fin 58 is at least partially disposed within the channel 38. It is to be appreciated that the locking fin 58 can be formed with the second end 62 of the locking fin 58 constantly disposed within the channel 38. Said differently, the second end 62 of the locking fin 58 can be disposed within the channel 38 such that the forming position and the insertion position are the same position. It is to be appreciated that the locking fin 58 can be formed in any suitable configuration and can be movable between any suitable positions. The locking fin 58 is further movable to locking position in which the weatherstrip assembly 30 is mounted to the frame 24. The locking position will be explained in further detail below. To simplify discussion, hereinafter the locking fin 58 will be discussed such that locking fin 58 is in one of the insertion and locking positions.

The locking fin 58 has an engagement surface 64. The engagement surface 64 is at least partially disposed within the channel 38. The abutment surfaces 50 of the retaining lips 48 substantially face the engagement surface 64. Said differently, the engagement surface 64 substantially faces the retaining lip surface 40 of the interior surface 36 of the body 32.

The weatherstrip assembly 30 includes a shim 66 extending from the second end 62 of the locking fin 58. In the insertion position, as shown in each of the embodiments respectively illustrated in FIGS. 4A, 4B, and 4C, the shim 66 is disposed within the channel 38 and is spaced from the shim surface 42. Typically, the shim 66 extends from the second end 62 of the locking fin 58 transverse to a portion of the locking fin 58 adjacent to the second end 62. Said differently, the shim 66 extends from the second end 62 substantially parallel to the base 44 of the channel 38. It is to be appreciated that the shim 66 can be disposed in any configuration from the second end 62 of the locking fin 58.

The shim 66 extends along the longitudinal dimension A of the body 32. In the locking position, the shim 66 engages the interior surface 36 and supports the locking fin 58 within the channel 38, as shown in FIGS. 5-7. More specifically, the shim 66 engages the shim surface 42 to space the locking fin 58 from the retaining lips 48. The flange 52 of the body 32 extends from the shim surface 42 between the distal end 54 and the shim 66 to retain the shim 66 in the channel 38. More specifically, the flange 52 selectively engages the shim 66 to retain the shim 66 in the channel 38. The shim 66 and the flange 52 engage when the shim 66 moves toward the channel opening 46 of the body 32.

The shim 66 extends from the second end 62 of the locking fin 58 away from the retaining lips 48 for supporting the locking fin 58 to partially define a slot 68. Both the retaining lips 48 and the locking fin 58 at least partially define the slot 68 for sandwiching the frame 24 between the retaining lips 48 and the locking fin 58 within the slot 68. The slot 68 is defined within the channel 38 of the body 32. As shown in FIG. 4, with the first end 60 of the locking fin 58 mounted to the exterior surface 34 of the body 32, the locking fin 58 and the body 32 define a slot opening 70 providing access to the slot 68. The slot opening 70 is planar to and partially disposed within the channel opening 46 of the body 32. With the first end 60 of the locking fin 58 mounted to the interior surface 36 of the body 32 as described above, the slot opening 70 is fully defined by the body 32 such that slot opening 70 is the same as the channel opening 46.

The locking fin 58 and the shim 66 are typically formed of a semi-rigid elastomeric material such as rubber, ethylene-propylene-diene-monomer (EPDM), Santoprene® thermoplastic elastomer (TPE) and the like. It is also to be appreciate that the locking fin 58 and the shim 66 can be formed of a cellular or sponge EPDM having a lower density and rigidity. In addition, it is to be appreciated that the locking fin 58 and the shim 66 can be any suitable hardness or hardnesses, rigidity or rigidities, density or densities, etc.

The weatherstrip assembly 30 is typically formed by an extrusion process. More specifically, the weatherstrip assembly 30 is typically formed by a co-extrusion process in which two or more dissimilar materials are simultaneously extruded to form a final component. As described above, the body 32, the seal 56, the locking fin 58, and the shim 66 are typically formed of dissimilar materials. During the co-extrusion process by an extruder, the dissimilar material of each of the body 32, the seal 56, the locking fin 58, and the shim 66 are continually flowed through the extruder to form a cross-section of the weatherstrip assembly 30 along the longitudinal dimension A of the body 32. As will be appreciated below, the cross-section of the weatherstrip assembly 30 can be varied along the longitudinal dimension A to change the configuration of the weatherstrip assembly 30. It is to be appreciated that the weatherstrip assembly 30 can be formed by any suitable process.

It is also to be appreciated that a coating can be disposed on each of the body 32, the seal 56, the locking fin 58, and the shim 66. The coating serves as an outer decorative component and is made from material which meets color, gloss and weatherability requirements of the individual application. In one embodiment, the coating is molded and made preferably of a colored, weatherable grade, acrylic-styrene-acrylonitrile polycarbonate (ASA/PC) alloy. However, the coating can comprise combinations of nylon alloy materials, such as ASA, thermoplastic (TPO), polyacrylate polyvinyl chloride (PVC) and the like. Also, the coating can be made of a film-laminated thermoplastic material, such as acrylonitrile-butadiene-styrene (ABS), polyethylene teraphthalate (PET), and polybutylene teraphthalate (PBT) and the like. In addition, the coating can comprise body-matched painted thermoplastic material from any variety of thermoplastic families based on ABS, PET, PBT, nylon, PA, and the like.

The shim 66 has a length L. As generally shown in FIG. 8, the length L of the shim 66 varies along the longitudinal dimension A of the body 32. For example, as shown in FIG. 5, the length L of the shim 66 is further defined as a first length $L_1$. As shown in FIG. 6, the length L of the shim 66 is further defined as a second length $L_2$. As shown in FIG. 7, the length L of the shim 66 is further defined as a third length $L_3$. It is to be appreciated that each of the lengths L can be disposed anywhere along the longitudinal dimension A of the body 32. Furthermore, it is to be appreciated that the lengths L can be any length L without escaping the scope of the subject invention.

As shown in FIGS. 5-7, the slot 68 has a width W. The width W is defined between engagement surface 64 of the locking fin 58 and the abutments surfaces of the retaining lips 48. The length L of the shim 66 and the width W of the slot 68 have an indirect relationship such that as the length L increases the width W correspondingly decreases and as the length L decreases the width W correspondingly increases. Specifically, as the length L of the shim 66 increases, the shim 66 spaces the engagement surface 64 of the locking fin 58 farther away from the shim surface 42 of the body 32. As the engagement surface 64 of the locking fin 58 is spaced farther away from the shim surface 42 of the body 32, the engagement surface 64 moves closer to the abutment surfaces 50 of the retaining lips 48. As such, the width W of the slot 68 decreases.

The slot 68 is configured to accept the frame 24 within. The frame 24 has a thickness T. The thickness T can vary longitudinally along the frame 24 depending on the configuration of the frame 24. Varying the width W of the slot 68 accommodates different configurations of the frame 24. For example, as shown in FIG. 5, the frame 24 is comprised primarily of a single layer of sheet metal. The thickness T of the frame 24 is further defined as a first thickness $T_1$. The shim 66 has the first length $L_1$ and the width W of the slot 68 is further defined as a first width $W_1$ with the first width $W_1$ configured to accept the frame 24 having the first thickness $T_1$ within the slot 68 and sandwich the frame 24 between the retaining lips 48 and the locking fin 58.

As shown in FIG. 6, the frame 24 is comprised of two layers of sheet metal. The thickness T of the frame 24 is further defined as a second thickness $T_2$ which is greater than the first thickness $T_1$. The shim 66 has the second length $L_2$ and the width W of the slot 68 is further defined as a second width $W_2$. The second width $W_2$ is greater than the first width $W_1$ shown in FIG. 5. The second width $W_2$ is configured to accept the frame 24 having the second thickness $T_2$ within the slot 68 and sandwich the frame 24 between the retaining lips 48 and the locking fin 58.

As shown in FIG. 7, the frame 24 is comprised of three layers of sheet metal. The thickness T of the frame 24 is further defined as a third thickness $T_3$ which is greater than the second thickness $T_2$. The shim 66 has the third length $L_3$ and the width W of the slot 68 is further defined as a third width $W_3$. The third width $W_3$ is greater than the second width $W_2$ shown in FIG. 6. The third width $W_3$ is configured to accept the frame 24 having the second thickness $T_3$ within the slot 68 and sandwich the frame 24 between the retaining lips 48 and the locking fin 58.

The engagement of the weatherstrip assembly 30 as shown in FIGS. 5-7 is illustrative in manner. It is to be appreciated that the thickness T of the flange 52 can be any thickness T with the shim 66 having the length L and the slot 68 having the width W which corresponds with the thickness T to sandwich the frame 24 between the retaining lips 48 and the locking fin 58. It is further to be appreciated that the thickness T of the flange 52 can vary longitudinally along the frame 24 with the length L of the shim 66 and the width W of the slot 68 varying in accordance with the thickness T to sandwich the frame 24 between the retaining lips 48 and the locking fin 58.

As discussed above, the retaining lips 48 extend from the interior surface 36 and angle inwardly into the channel 38 for accepting the frame 24 into the slot 68. Specifically, the angularity of the retaining lips 48 allow the frame 24 to progressively engage and slide along the abutment surfaces 50 of the retaining lips 48 during insertion of the frame 24 into the slot 68 through the slot opening 70. During insertion, the frame 24 moves the locking fin 58 from the insertion position to the locking position. The frame 24 moves into the slot 68 until the frame 24 abuts the interior surface 36 of the body 32 at the base 44 of the channel 38. In the locking position, the retaining lips 48 bias away from the retaining lip surface 40 and the shim 66 biases away from the shim surface 42 for sandwiching and maintaining the frame 24 between the retaining lips 48 and the locking fin 58. As discussed above, the abutment surfaces 50 of the retaining lips 48 substantially face the engagement surface 64 of the locking fin 58 for engaging and sandwiching the frame 24 within the slot 68. The bias of the retaining lips 48 and the shim 66 inwardly into the slot 68 increases the frictional engagement of the engagement surface 64 and the abutment surfaces 50 with the frame 24 to mount the weatherstrip assembly 30 to the frame 24.

In an alternative embodiment, as shown in FIG. 4C, the engagement surface 64 of the locking fin 58 is further defined as a contact layer 72. The contact layer 72 has an increased coefficient of friction for retaining the frame 24 within said slot 68. Typically, the contact layer 72 is formed of a tacky thermoplastic elastomer. The engagement surface 64 abuts the frame 24 in the locking position. The contact layer 72 increases the friction between the engagement surface 64 and the frame 24. The increased friction, in conjunction with the sandwiching of the frame 24 between the retaining lips 48 and the locking fin 58, further retains the frame 24 within the slot 68.

The subject invention also discloses a method of producing the weatherstrip assembly 30. The weatherstrip assembly 30 has the body 32 having the longitudinal dimension A, the locking fin 58 having the length dimension D, and the shim 66 having the length L, as shown in FIGS. 4A and 8.

The method includes the steps of extruding the body 32 along the longitudinal dimension A and simultaneously extruding the locking fin 58 along the longitudinal dimension A of the body 32 with the length dimension D of the locking fin 58 remaining constant along the longitudinal dimension A. The method also includes the step of simultaneously extruding the shim 66 along the longitudinal dimension A of the body 32 with the length L of the locking fin 58 varying along the longitudinal dimension A.

The subject invention also discloses a method of assembling the weatherstrip assembly 30 on the vehicle 20 with the vehicle 20 having the frame 24. The weatherstrip assembly 30 has the body 32 defining the channel 38 and having the interior surface 36 within the channel 38, as shown if FIG. 8. The body 32 has the plurality of retaining lips 48 extending into the channel 38. The seal 56 extends from the body 32 and the locking fin 58 extends from the body 32. The shim 66 extends from the locking fin 58 and the retaining lips 48 and the locking fin 58 partially define the slot 68.

The method includes the steps of moving the locking fin 58 relative to the body 32 and disposing the shim 66 and a portion of the locking fin 58 within the channel 38, as shown in FIG. 4A. The method further includes the steps of abutting the shim 66 with the interior surface 36 of the body 32 and disposing the frame 24 within the slot 68 to sandwich the frame 24 between the retaining lips 48 and the locking fin 58, as shown in FIGS. 5-7.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A weatherstrip assembly for sealing between a frame and a closure member of a vehicle, said comprising:
    a body having an exterior surface and an interior surface defining a channel with said body having a plurality of retaining lips extending from said interior surface into said channel for retaining said body to the frame, with said interior surface including a retaining lip surface and a shim surface disposed opposite one another to define sides of said channel and with said retaining lips extending from said retaining lip surface;
    a seal extending from said exterior surface for abutting and sealing the closure member;
    a locking fin having a first end and a second end with said first end of said locking fin mounted to one of said interior surface and said exterior surface and said second end of said locking fin having a first position disposed outside of said channel and having a second position disposed within said channel to at least partially dispose said locking fin within said channel with said locking fin being deflectable between said first and second positions; and
    a shim extending from said second end of said locking fin with said shim formed on said locking fin when said locking fin is in said first position and engaging said shim surface of said interior surface when said locking fin is in said second position to space said locking fin from said interior surface, with said retaining lips and said locking fin at least partially defining a slot having a locking fin side adjacent said locking fin and a retaining lip side adjacent said retaining lips for sandwiching the frame between said retaining lips and said locking fin within said slot;
    wherein said shim has a length, said slot has a width, and said body has a longitudinal dimension perpendicular to each of said length and said width, with said length of said shim varying along said longitudinal dimension, and said length and said width having an indirect relationship such that as said length increases along said longitudinal dimension said width correspondingly decreases and as said length decreases along said longitudinal dimension said width correspondingly increases; and
    wherein said locking fin extends along a majority of said shim surface to said shim when in said second position such that only said locking fin and said shim define said locking fin side of said slot for sandwiching the frame between said retaining lips and said locking fin within said slot with said locking fin and said plurality of retaining lips all directly engaging the frame.

2. A weatherstrip assembly as set forth in claim 1 wherein said shim extends from said second end of said locking fin away from said retaining lips for supporting said locking fin to partially define said slot.

3. A weatherstrip assembly as set forth in claim 1 wherein said locking fin has a length dimension between said first end and said second end with said length dimension being constant along said longitudinal dimension.

4. A weatherstrip assembly as set forth in claim 1 wherein said retaining lips bias away from said retaining lip surface and said shim biases away from said shim surface for sandwiching and maintaining the frame between said retaining lips and said locking fin.

5. A weatherstrip assembly as set forth in claim 1 wherein said body includes a flange extending from said shim surface angled inwardly into said channel with said flange selectively engaging said shim to retain said shim in said channel.

6. A weatherstrip assembly as set forth in claim 5 wherein said shim surface has a distal end with said flange extending from said shim surface between said distal end and said shim to retain said shim in said channel.

7. A weatherstrip assembly as set forth in claim 1 wherein each of said retaining lips has an abutment surface and said locking fin has an engagement surface with said abutment surfaces substantially facing said engagement surface for engaging and sandwiching the frame within said slot.

8. A weatherstrip assembly as set forth in claim 7 wherein said engagement surface of said locking fin is further defined as a contact layer having an increased coefficient of friction for retaining the frame within said slot.

9. A weatherstrip assembly as set forth in claim 1 wherein said retaining lips extend from said interior surface and angle inwardly into said channel for accepting the frame into said slot.

10. A weatherstrip assembly as set forth in claim 1 wherein said first end of said locking fin is mounted to said exterior surface of said body.

11. A weatherstrip assembly as set forth in claim 1 wherein said first end of said locking fin is mounted to said interior surface of said body.

* * * * *